United States Patent [19]

Peyton, Jr. et al.

[11] Patent Number: 5,920,723

[45] Date of Patent: Jul. 6, 1999

[54] COMPILER WITH INTER-MODULAR PROCEDURE OPTIMIZATION

[75] Inventors: John T. Peyton, Jr., Medford; Stuart de Jong, Arlington, both of Mass.

[73] Assignee: Hewlett-Packard Company, Palo Alto, Calif.

[21] Appl. No.: 08/795,986

[22] Filed: Feb. 5, 1997

[51] Int. Cl.[6] .................................................. G06F 9/445
[52] U.S. Cl. ........................ 395/707; 395/685; 395/704; 395/709
[58] Field of Search .................................. 395/707, 704, 395/685, 709

[56] References Cited

U.S. PATENT DOCUMENTS

| 5,161,216 | 11/1992 | Reps et al. | 395/704 |
|---|---|---|---|
| 5,291,601 | 3/1994 | Sands | 395/685 |
| 5,375,242 | 12/1994 | Kumar et al. | 395/707 |
| 5,428,793 | 6/1995 | Odnert et al. | 395/709 |
| 5,485,616 | 1/1996 | Burke et al. | 395/709 |
| 5,555,417 | 9/1996 | Odnert et al. | 395/707 |
| 5,701,489 | 12/1997 | Bates et al. | 395/705 |
| 5,778,212 | 7/1998 | Dehnert et al. | 395/500 |
| 5,784,556 | 7/1998 | Sanchez et al. | 395/200.78 |

OTHER PUBLICATIONS

ACM Principles and Practice of Programming Languages, 1994, pp. 1–11, Brad Calder et al., "Reducing Indirect Function Call Overhead In C++ Programs".

ACM SIGPLAN Notices, vol. 29, No. 4, Apr. 1994, pp. 41–48, Jon Loeliger et al., "Developing An Interprocedural Optimizing Compiler".

Hewlett Packard HP 9000 Computers, Jul. 1996, pp. 1-1-4-1 and A-1, "HP PA-RISC Compiler Optimization Technology White Paper".

Hewlett Packard HP Confidential, Version 1.3, Nov. 15, 1991 Daryl Odnert, "An Overview of the Compiler Architecture for Advanced Optimization on PA-RISC".

Technical Report TRCS 95–22 (University of California), Dec. 1995, pp. 1–25, Gerald Aigner et al., "Eliminating Virtual Function Calls in C++ Programs".

Grunwald et al., "Whole–Program Optimization for Time and Space Efficient Threads", ACM Digital Library, pp. 50–59, Jul. 1996.

Gerard Ellis, "Compiling Conceptual Graphs", IEEE, pp. 68–81, Feb. 1995.

Robert D. Cameron, "Source Encoding Using Syntactic Information Source Models", IEEE, pp. 843–850, Jul. 1988.

Lefurgy et al., "Improving Code Density Using Compression Techniques", IEEE, pp. 194–203, 1997.

Cooper et al, Procedure Cloning, 1992 IEEE, 96–105, Jun. 1992.

Primary Examiner—Tariq R. Hafiz
Assistant Examiner—Ted T. Vo

[57] ABSTRACT

A compiler method is adapted to be executed by a computer with limited memory, yet enables cross-CU optimization during the conversion of a source code listing to an object code listing. The compiler method includes the steps of: converting plural source code listings into plural CUs, each CU being an intermediate code representation; analyzing each CU and deriving a global CU table which includes a reference to each analyzed CU; a program symbol table which indicates in which CU each program routine is defined and/or referred to; and a global call graph which notes each routine in each CU, indicates references therebetween, and further indicates where the routine exists in the program symbol table. The method further derives a CU symbol table which includes information that includes a reference for each routine defined in a CU to the intermediate representation for that routine. The method compiles the CUs by analyzing each CU and employing at least the global call graph and program symbol table to enable cross CU relationships to be taken into account and utilized in arranging an improved object code representation of the source code listing. CUs which are being operated upon are stored in uncompressed form; whereas other CUs may be stored in either uncompressed form, compressed form or off-line on a disk memory.

12 Claims, 4 Drawing Sheets

COMPILER WITH INTER-MODULAR PROCEDURE OPTIMIZATION

FIELD OF THE INVENTION

This invention relates to a source code compiler which operates upon modules of source code listings and converts them into executable object code and, more particularly, to a source code compiler which enables inter-modular optimization of procedures present therein.

BACKGROUND OF THE INVENTION

At present, there are two common steps involved in constructing an application which will run on a computer. The first step is the compilation phase which accomplishes a translation of the source code to a set of object files written in machine language. The second step is the link phase which combines the set of object files into an executable object code file. Almost all code generation and optimization decisions are made during the compilation phase and the link phase primarily relocates code and data, resolves branch addresses and provides binding to run-time libraries.

Today, most modern programming languages support the concept of separate compilation, wherein a single computer source code listing is broken up into separate modules that can be fed individually to the language translator that generates the machine code. This separation action allows better management of the program's source code and allows faster compilation of the program. The separate code modules will hereafter be referred to synonymously as either "modules" or "compilation units" (CUs).

The use of CUs during the compilation process enables substantial savings in required memory in the computer on which the compiler executes. However, such use limits the level of application performance achieved by the compiler. For instance, optimization actions that are taken by a compiler are generally restricted to procedures contained within a CU, with the CU barrier limiting the access of the compiler to other procedures in other CUs. This limitation is of significance when attempting to accomplish either in-lining or cloning, as the selection of call-sites is restricted at which these optimizations can be performed.

In-lining replaces a call site with the called routine's code. In-line substitution serves at least two purposes: it eliminates call overhead and tailors the call to the particular set of arguments passed at a given call site. Cloning replaces a call site with a call to a specialized version of the original called procedure. Cloning allows for constant arguments to be propagated into the cloned routine. More specifically, cloning a procedure results in a version of the called procedure that has been tailored to one or more specific call sites, where certain variables are known to be constant on entry.

Importantly, modular handling of routines by the compiler creates a barrier across which information, which could be of use to the compiler, is invisible.

It has been recognized in the prior art that making cross-modular information available during the compilation action will improve application performance. Thus, a compiler which can see across modular barriers can achieve significant benefits of inter-procedural optimization and achieve noticeable gains in performance of the resulting application.

Loeliger et al. in a paper entitled "Developing an Interprocedural Optimizing Compiler", ACM SIGPLAN Notices, Vol 29, No. 4. April 1994, pp41-48, describe how a compiler developed for use in the C-series Supercomputers (marketed by the Convex Computer Corporation) enables inter-procedural optimization. Initially, a series of passes are made over a database that contains information about all of the procedures in the application. A number of analyses are performed to provide information (where traditional compilers make worst-case assumptions). For instance, the database is analyzed to determine which procedures are invoked by a call (call analysis); which names refer to a same location (alias analysis); which pointers point to which locations (pointer tracking); which procedures use which scalars (scalar analysis); which procedure should be in-lined at which call sites (inline analysis); etc., etc.

The results of these analyses, i.e. a "profile feedback", are then employed during the compile action to achieve application improvement. Little description is made available by Loeliger et al. regarding how the actual "build" process utilizes the profile feedback information achieved during the database analysis. Further, the Loeliger et al. process is not compatible with a widely used "make" utility, available in many operating systems. For instance, in the UNIX operating system, the "make" utility enables the construction of a make file to enable changes to be placed into a program listing. The make file includes commands which perform as little work as possible, i.e., only converting the new changes to object code. The make utility then links the old compiled code with just the overwritten new object code and avoids the necessity of having to recompile the entire code listing.

It is important that any new compiler be compatible with the make utility. Further, it is important that any new compile procedure be able to run at a reasonable speed, given the limited levels of memory available on personal computer and work station-style processors.

Accordingly, there is a need for an improved compiler which enables cross-CU optimization and is compatible with the make utility. Further, there is a need for an improved compiler which enables cross-CU optimization, while keeping compile time short and minimizing the amounts of required memory for execution of the optimization procedure.

SUMMARY OF THE INVENTION

A compiler method is adapted to be executed by a computer with limited memory, yet enables cross-CU optimization during the conversion of a source code listing to an object code listing. The compiler method includes the steps of: converting plural source code listings into plural CUs, each CU being an intermediate code representation; analyzing each CU and deriving a global CU table which includes a reference to each analyzed CU; a program symbol table which indicates in which CU each program routine is defined and/or referred to; and a global call graph which notes each routine in each CU, indicates references therebetween, and further indicates where the routine exists in the program symbol table. The method further derives a CU symbol table which includes information that includes a reference for each routine defined in a CU to the intermediate representation for that routine. The method compiles the CUs by analyzing each CU and employing at least the global call graph and program symbol table to enable cross CU relationships to be taken into account and utilized in arranging an improved object code representation of the source code listing. CUs which are being operated upon are stored in uncompressed form; whereas other CUs may be stored in either uncompressed form, compressed form or off-line on a disk memory.

DETAILED DESCRIPTION OF THE INVENTION

Figure 1:
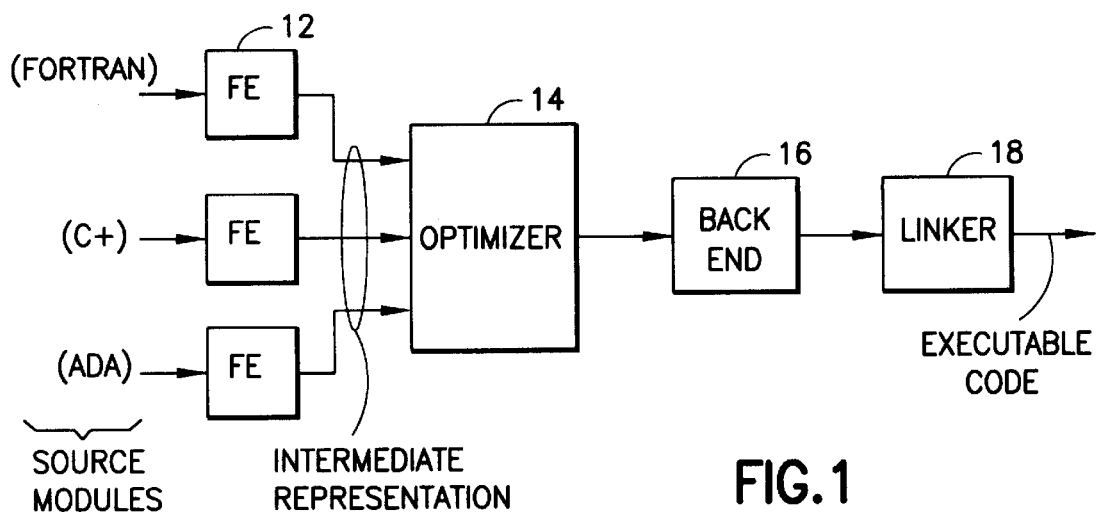
FIG. 1 is a block diagram of functions performed in a prior art compiler, wherein cross-CU optimization is not available.

Referring to FIG. 1, a conventional compiler system is illustrated. A source listing (i.e., Fortran, C++, ADA, or some other source code) is fed to a front end converter 12 which converts the received source listing into an intermediate code representation (IR). As each source CU is fed to front end converter 12, the output is an IR code listing of the source code lines within the inputted CU. That CU is then fed to an optimizer 14 which performs optimizations on the received IR code to improve its execution efficiency.

As above indicated, optimizer 14 generally applies its optimization actions to each CU, per se, and does not provide cross-CU optimization actions. Thereafter, the optimized CU (still in IR form) is fed to a back end processor 16 which outputs an object code listing for the entire CU. Thereafter, the object code listing is fed to a linker 18 which connects the various CUs into an executable form of object code for the computer on which the code is to execute.

Figure 2:
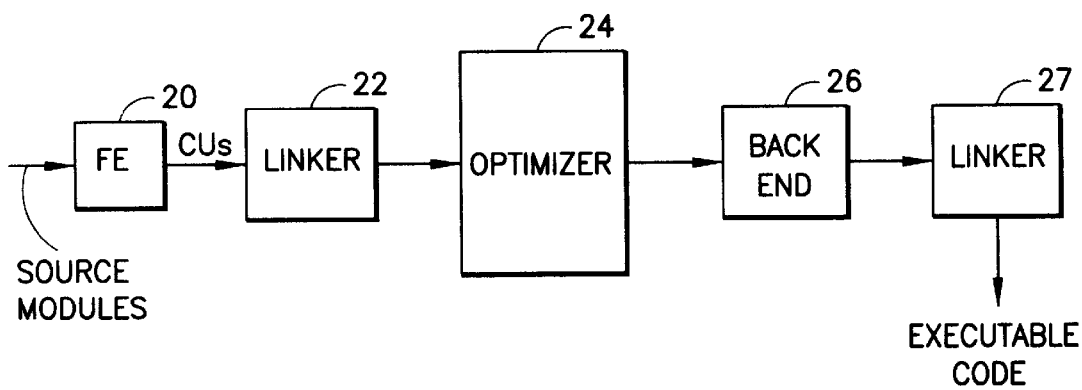
FIG. 2 is a block diagram of compiler functions performed in the invention hereof which enable cross-CU optimization.

In FIG. 2, a block diagram of a compiler which incorporates the invention. Source code CUs are fed to front end processor 20 which converts the input source code modules to corresponding IR object code CUs which maintain the source code module boundaries. Accordingly, the IR object code CUs still remain compatible with the make utility described above.

Each CU is fed to a linker 22 which determines if the input code is in IR form or in object code form. The IR form code is fed to optimizer 24 which establishes a number of tables that are utilized to achieve a program-wide optimization, notwithstanding the segmentation of the program input to CU size blocks. Thereafter, the optimized code listing for each CU is fed to back end processor 26 which, in turn, outputs object code CUs that are then linked by linker 27 into a continuous form executable code.

Figure 2A:
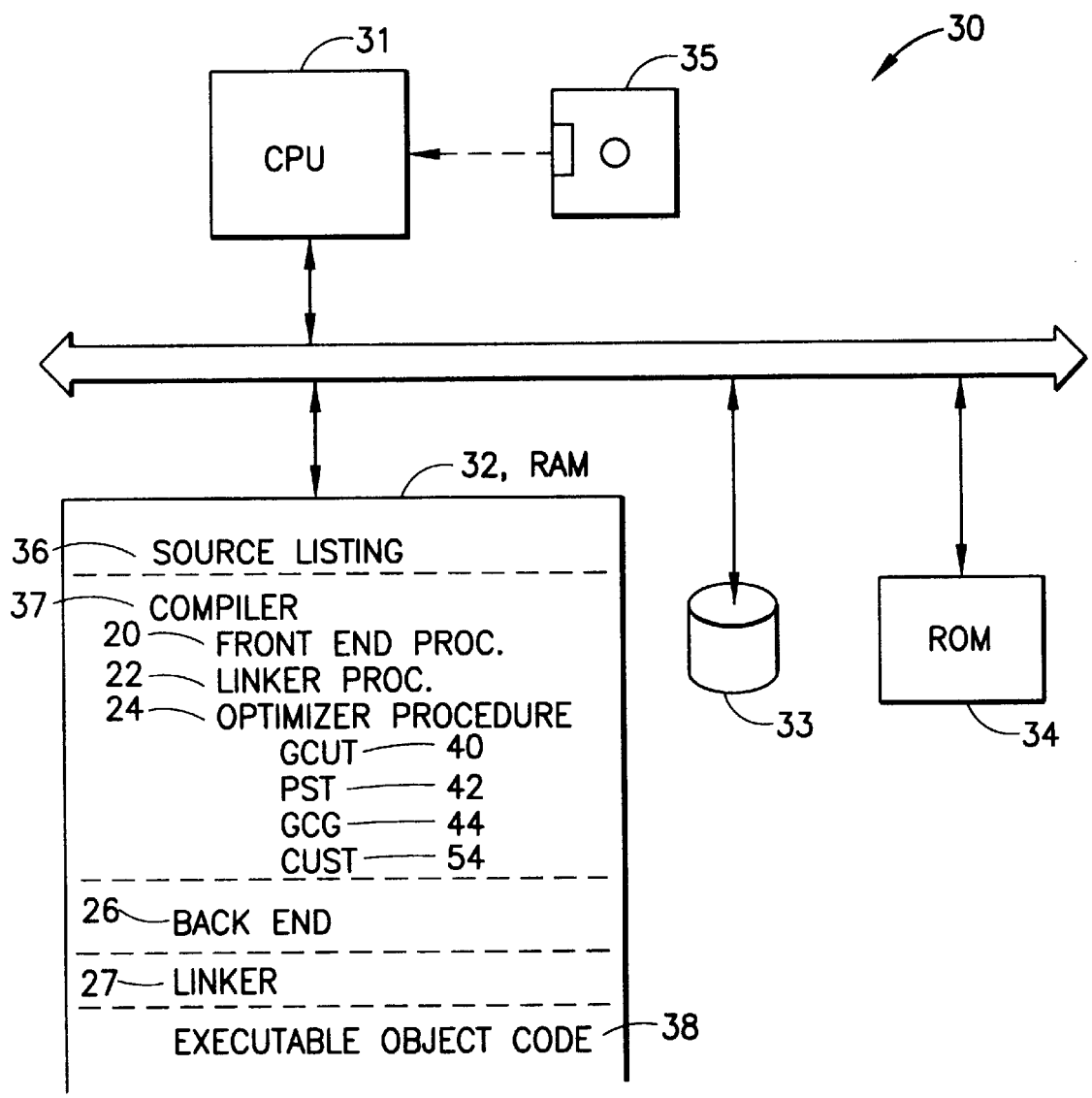
FIG. 2a is a block diagram of a system for executing the compiler of FIG. 2.

In FIG. 2a, a system for executing the compiler of FIG. 2 is illustrated. A computer 30 includes a central processing unit (CPU) 31 which is coupled via a bus system to a random access memory (RAM) 32, a disk drive 33 and a read-only memory (ROM) 34. A memory cartridge 35 is employed to insert a source listing into computer 31 and, further, may also be used to insert a compiler routine which incorporates the invention hereof.

RAM 32, as an example, provides temporary storage for a plurality of code listings that are utilized during the operation of the invention. Source listing 24 comprises a set of files including a plurality of routines to be run in the course of execution of the program defined by source listing 36. A compiler 37 is employed to convert source listing 36 into machine executable object code 38 (that is further stored in RAM 32). Compiler 37 includes a listing for optimizer procedure 24 and further includes a number of tables that will be discussed in respect to FIG. 4, i.e. global compilation unit table 40, program symbol table 42, global call graph table 44 and a compilation unit symbol table 54 for at least one compilation unit.

The remaining description will concern the operation of optimizer 24, wherein progam-wide optimization is achieved, while accomplishing conservation of memory facilities.

As will be hereafter understood, the method performed by the invention employs a hierarchical representation of the program which allows different sized CUs to be manipulated for best memory resource usage. The CUs are configured in either a fully expanded form code that is maintained in virtual memory (e.g., in RAM); in a compressed form stored in virtual memory; or as compressed CUs that are written to files contained in disk memory. The method enables the CUs to be read in from disk and uncompressed only when needed.

Figure 3:
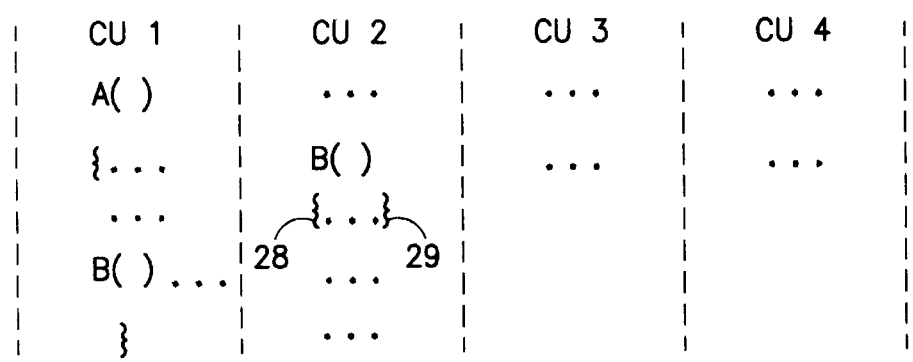
FIG. 3 is a schematic representation of four code listings which are serially input into the compiler of FIG. 2.

Referring to FIG. 3, a plurality of CUs, i.e., CU1; CU2; CU3; etc. are shown. These CUs are serially fed to front end converter 20, are converted to IR object code form and are then passed to linker 22. CU1 and CU2 include many lines of source code; however, only several are shown in the Fig. and these will be used for explanation purposes during the description below of the files which are created and the interaction thereof with the procedures executed by optimizer 24.

For instance, CU1 includes routine A ( ) which includes a call to routine B ( ). The format of CU1 is written in C++ form with "A ( )" and "B ( )" indicating the names of the routines and following enclosures { } indicating that code is contained therebetween which defines the respective routine. In CU2, routine B ( ) is defined and its actual code listing is found between enclosures 28 and 29. In CU1, only the name B ( ) is present.

Figure 4:
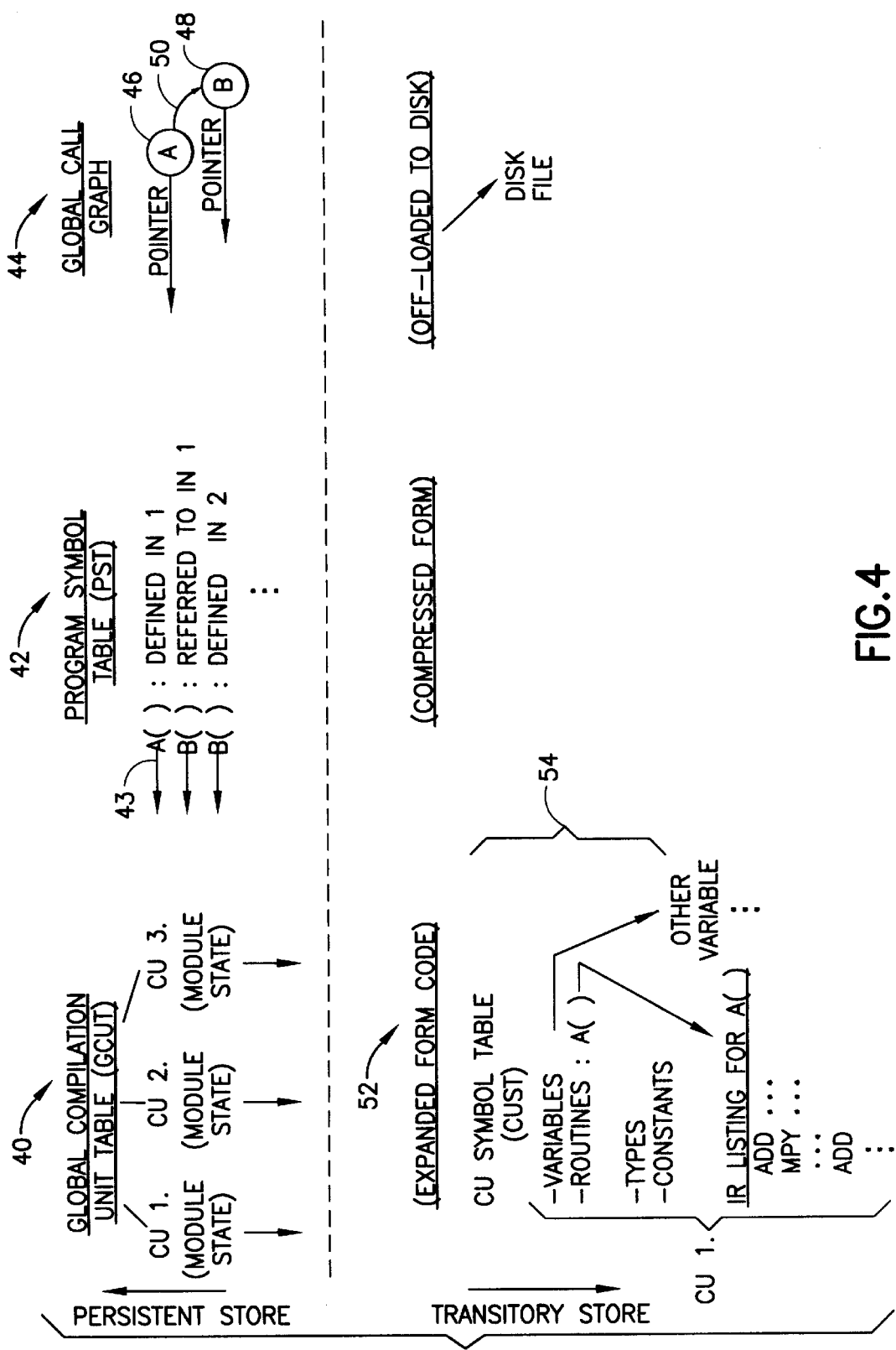
FIG. 4 is a schematic diagram illustrating various tables and listings which are provided during the action of the system of FIG. 2 and which enable cross-CU optimization.

Turning now to FIG. 4, the files and tables established by optimizer 24 will be described. As the CU IR object code is received, three program-wide listings are established as follows. A global CU table (GCUT) 40 includes a pointer to each received CU, along with an indication of the state of the respective CU. More specifically, each GCUT entry includes an indication as to whether the CU is in expanded form, has been compressed or is on disk. Each GCUT entry for a CU further includes a pointer to the address where the CU can be found in virtual memory (if present there).

GCUT 40 and the additional program-wide tables/listings are maintained in persistent storage and remain there for the entire duration of the compilation action. As will be hereafter understood, individual CUs are positioned in transitory store where they may be either in fully expanded form; in compressed form (both in virtual memory); or offloaded onto a disk file.

A program symbol table (PST) 42 is built as the CU IR object code is received. PST 42 lists each routine in the received CU and indicates whether the routine is defined in the CU and/or whether the routine is just referred to in the CU and its actual definition resides elsewhere. For instance, when CU1 is received and routine A ( ) is encountered, it is determined that A( ) is defined in CU1 and this information is loaded into PST 42. The same action occurs when B ( ) is encountered; however, by its placement in the code listing, it is determined that routine B ( ) is merely referred to in CU1. (Note, that for the location of definition of B ( ) to be determined, the program must await the input of CU2).

As each entry for a routine is made in PST 42, a pointer 43 is associated therewith which points to the CUs which either define the routine or refer to the routine, as the case may be.

As each routine is encountered in the incoming object code data stream, a global call graph (GCG) 44 is constructed. A node, e.g., 46, 48, . . . , is assigned as each routine is identified. Thus, when routine A ( ) is encountered in the incoming code stream, GCG 44 has node 46 placed therein with a pointer to the corresponding entry in PST 42. However, as no further information is yet available for routine A ( ), no linkings are established therefor. When routine B ( ) is encountered, a node 48 is established in GCG 44 and an edge 50 is created indicating that routine A ( ) includes a call to routine B ( ). A pointer is also established from node 48 and indicates where in PST 42 an entry for routine B ( ) can be found.

When node 48 is initially established, the "referred-to" entry in PST 42 is determined from the code in CU1; however, information regarding where routine B ( ) is defined is not yet present. That information arrives when CU2 is received with its indication of the definition of routine B ( ).

Within the transitory store portion of virtual memory, received CU's are initially stored in expanded form until the amount of virtual memory allocated to expanded form CU storage reaches a threshold level. Thereafter, received CU's are stored in virtual memory in compressed form and if further virtual memory is not available therefor, are off-loaded onto a disk file where they can be accessed by a call from optimizer 24.

As each CU is received, it is initially stored in expanded form as shown at 52. A CU symbol table (CUST) 54 is established for each received CU and includes listings of variables, routines, types and constants contained within the respective CU. For instance, CUST 54 for CU1 includes a listing for routine A ( ) with a pointers to the actual IR code 56 for routine A ( ). In similar fashion, the variables entry in CUST 54 includes variables 58 which are referred to in the IR for CU1.

A routine's IR code may refer to its CUST in several places; however, the CUST has only one reference to the routine's IR (i.e., a single handle representing the routine). This structure allows individual routines to be compressed or removed from virtual memory when they are not needed by optimizer 24 and then later recalled and decompressed by using information stored in the handle. A CUST is related to entries in PST 42 in a similar manner. A CUST may refer to PST 42 in several places, however, PST 42 has only one reference to the CUST through a single handle representing the CUST. This structure allows individual CUST's to be compressed or removed from virtual memory when none of the routines that are listed therein are needed by optimizer 24. They may be re-expanded in memory by using the single handle.

As regards GCG 44, the nodes therein refer only to symbols stored in PST 42 and not to the intermediate representation or any entities in the CUST's. This allows the full GCG to be visible to optimizer 24 for the performance of in-lining or inter-procedural information propagation without having the fully expanded program representation in virtual memory. The representations of PST 42 and GCG 44 are minimal and much smaller than the sum of the intermediate representation and the CUST's for the entire program. Only as much of an intermediate representation or as many of the CUST's as are needed for a particular optimization (e.g., in-lining) need to be expanded to their largest form at the same time.

Figure 5:
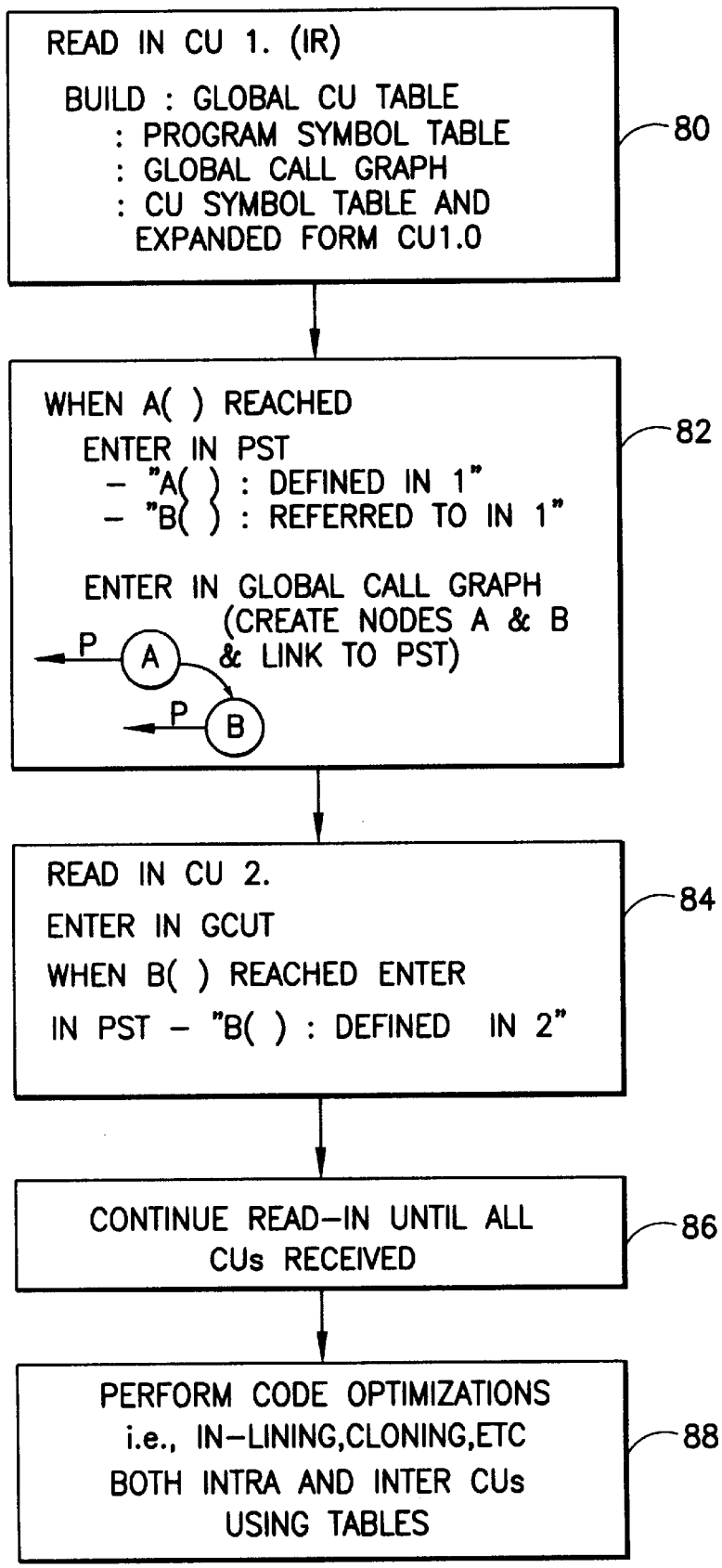
FIG. 5 is a logical flow diagram which illustrates an example of the compilation action performed by the invention hereof.

Turning now to FIG. 5, the procedure followed by the invention will be described. Initially, CU1 (in IR object code form) is read from front end converter 22 (box 80). In response, optimizer 24 commences building GCUT 40, PST 42, GCG 44 and CUST 54. Further, the expanded form of CU1 is stored in virtual memory.

When routine A ( ) is reached, its code listing is analyzed (box 82) and the following entries are made in PST 42: "A ( ): defined in 1" and "B ( ): referred to in 1". Further, nodes A and B are entered in GCG 44 and an edge is created between nodes A and B indicating that a call is made from node A to node B. In addition, links are established for both nodes A and B back to the corresponding entries in PST 42.

Thereafter, assuming that CU1 has now been read into transitory store (i.e., virtual memory) in expanded form, CU2 is read in (box 84). An entry is made for CU2 in GCUT 40. In addition, when routine B ( ) is reached, an entry is made PST 42 indicating as follows: "B ( ): defined in 2". Thereafter, the reading-in of CU2 is continued until the entirety of CU2 has been read in and analyzed.

During this time, if a memory threshold value for expanded form data is reached, the oldest read-in CUs, for example, are converted to a compressed form and are maintained in virtual memory until a further threshold is reached, at which time they are off-loaded onto a disk file in its compacted form. Other removal/replacement procedures can also be employed.

Once all CU's have been received, analyzed and stored (box 86), a code optimization procedure commences (box 88) wherein in-lining, cloning, etc. is performed on succeeding CUs. Certain compilation actions which do not require cross-CU access can be performed while individual CUs are being read-in. Further code optimization actions, requiring cross-CU access, can also be accomplished while a read-in is being performed or may wait until all CUs have been received and stored.

A significant benefit is achieved during the compilation action by in-lining of code in the CUs. A decision tree is utilized in determining which calls should be replaced by in-line listings and which should not. For instance, GCG 44 is examined to determine all edges between all nodes, as each edge represents a call between nodes. From such examination, it is determined how often each call is made. Then, it is determined which call sites can support an in-lining action. All information required to make this determination is represented in the GCG, so during this determination none of the CUs need to be in expanded form. For instance, if a call is required between routines in different CUs, and the compile assumptions were different for the different CUs, then the choice is generally made not to perform in-lining—to avoid the complexities of inserting additional data regarding the different compile assumptions. Using this type of analysis and others that are known to those skilled in the art, edges in GCG 44 which will not support an in-lining action are eliminated from further consideration.

Next, the in-lining procedure focuses on the remaining call sites and determines a benefit value to be gained by in-lining at each. As a result of the initial analysis of GCG 44, the number of calls made from each site to each other site have been accumulated. For each site, a "cost estimate" is then made for each call, i.e., how much will the code at the site grow if an in-lining action is performed with respect to that site.

A benefit value is then determined by deriving a ratio of the number of calls made by a call site and the cost number derived for the call site. When all sites have been so analyzed, a routine is run which enables selection of those call sites evidencing a benefit value which exceeds a predetermined threshold. That threshold is preferably a limit value on the amount of code growth at a call site. The routine analyzes the benefit value with respect thereto—to come out with a listing of call sites which are to be in-lined, within the limits of available memory allocated to the code.

Thereafter, the in-lining action is executed and the relevant code listings are inserted in place of the specific call sites. The GCG and PST are then updated to accurately reflect the new program state. For instance, wherever a called routine has been in-lined, there is no longer a call and the corresponding edge in the GCG is removed.

During the read-in action to the compiler, generally only the CU being read-in is maintained in expanded form. Earlier received CUs are compressed and maintained in virtual memory until a threshold memory level is reached, at which point they are off-loaded onto disk. Thereafter, during the optimization procedure, the CU being optimized is maintained in expanded form in virtual memory and, during in-lining, as each call site is reached that refers to a routine in another CU, that CU is accessed from disk (assuming it is not already in virtual memory); decompressed and utilized for the optimization action.

From the above, it can be seen that the procedure of the invention allows processing of large amounts of code and data by a compiler on a machine with limited amounts of memory resources. Further, the procedure is compatible with the prior art "make" utility that is widely used by software developers. The procedure includes different levels of memory use optimization and is dynamically scalable, depending upon the user's development environment. The data representations lend themselves to efficient use of memory, because large portions of the data can be compacted, removed from virtual memory and then off-loaded to disk.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A compiler method for converting a source code listing comprising plural code modules, to an object code listing, said method adapted to be executed by a computer with limited memory resources, said method comprising the steps of:

converting said source code listing into plural compilation units (CUs), each CU being an intermediate code listing corresponding to a code module of said source code listing;

analyzing each CU and deriving:
global CU table (GCUT) means for including a reference to each analyzed CU and an indication of whether or not said each analyzed CU is stored in compressed form;
program symbol table (PST) means for indicating in which CU, each program routine is defined and/or referred to;
global call graph (GCG) means for noting each program routine in each CU, indicating references therebetween, and further indicating where said each program routine is present in said PST; and
CU symbol table (CUST) means, for each routine listed in a CU, for including a reference to a location where the routine can be found in memory; and compiling received CUs by employing at least data from said GCG means and PST means in analysis of each CU to enable cross-CU relationships to be taken into account during the analysis and utilized in arranging an object code representation of said source code listing.

2. The method as recited in claim 1, including the further steps of:

storing said GCUT means, PST means and GCG means in virtual memory in said computer;

storing at least a further CUST means and associated CU listing in uncompressed form in said virtual memory and storing another CUST means and associated CU listing in compressed form; and decompressing said another CUST means and associated CU upon determining during said compiling step of a reference thereto from a CU being optimized, said determining at least based upon data accessed from said GCG means and PST means.

3. The method as recited in claim 2, further including the further steps of:

storing a still further CUST means and associated CU in a disk store; and accessing from said disk store said still further CUST means and associated CU and storing a decompressed form thereof in virtual memory upon determining during said compiling step of a reference to said still further CUST means and associated CU from a CU being optimized.

4. The method as recited in 1, wherein said GCUT means further includes for each CU, information indicating whether said each CU is resident in uncompressed form in virtual memory, is resident in compressed form in virtual memory; or is resident in a disk store in compressed form, said method employing said information to determine if either a decompression of said each CU or a reading of said each CU from disk to virtual memory is required.

5. The method as recited in claim 1, wherein each CU corresponds to a source code file.

6. The method as recited in claim 1, wherein said compiling step comprises the further step of:

determining from said cross-CU relationships which call sites in one CU should be replaced by a called program routine resident in a second CU.

7. A memory media including code for enabling a computer with limited memory resources to perform a compiler method which converts a source code listing to an object code listing, said memory media comprising:

a) means for controlling said computer to convert said source code listing into plural compilation units (CUs), each CU being an intermediate code listing of a corresponding module of said source code listing;

b) means for controlling said computer to analyze each CU and to derive:
global CU table (GCUT) means for including a reference to each analyzed CU and an indication of whether or not said each analyzed CU is stored in compressed form;
program symbol table (PST) means for indicating in which CU, each program routine is defined and/or referred to;
global call graph (GCG) means for noting each program routine in each CU, indicating references therebetween, and further indicating where said each program routine is present in said PST means; and
CU symbol table (CUST) means for each CU which, for each routine listed in a CU, includes a reference to a location where the routine can be found in memory; and c) means for controlling said computer to compile received CUs by employing at least data from said GCG means and PST means in analysis of each CU to enable cross-CU relationships to be taken into account during the analysis and utilized in arranging an object code representation of said source code listing.

8. The memory media recited in claim 7, further comprising:

means for controlling said computer to store said GCUT means, PST means and GCG means in said virtual memory;

means for controlling said computer to store at least a further CUST means and associated CU listing in uncompressed form in said virtual memory and to store another CUST means and associated CU listing in compressed form; and means for controlling said computer to decompress said another CUST means and associated CU upon determining a presence of reference thereto from a CU being optimized, said determining at least based upon data accessed from said GCG means and PST means.

9. The memory media recited in claim 8, further comprising:

means for controlling said computer to store a still further CUST means and associated CU in a disk store; and means for controlling said computer to access from said disk store said still further CUST means and associated CU and to store a decompressed form thereof in virtual memory upon determining a presence of a reference to said still further CUST means and associated CU from a CU being optimized.

10. The memory media as recited in 7, wherein said GCUT means further includes for each CU, information indicating whether said each CU is resident in uncompressed form in virtual memory, is resident in compressed form in virtual memory; or is resident in a disk store in compressed form, said means c) employs said information to determine if either a decompression of said each CU or a reading of said each CU from disk to virtual memory is required.

11. The memory media recited in claim 7, wherein each CU corresponds to a source code file.

12. The memory media recited in claim 7, wherein said means c) determines from said cross-CU relationships which call sites in one CU should be replaced by a called program routine resident in a second CU and performs a replacement accordingly.

* * * * *